UNITED STATES PATENT OFFICE.

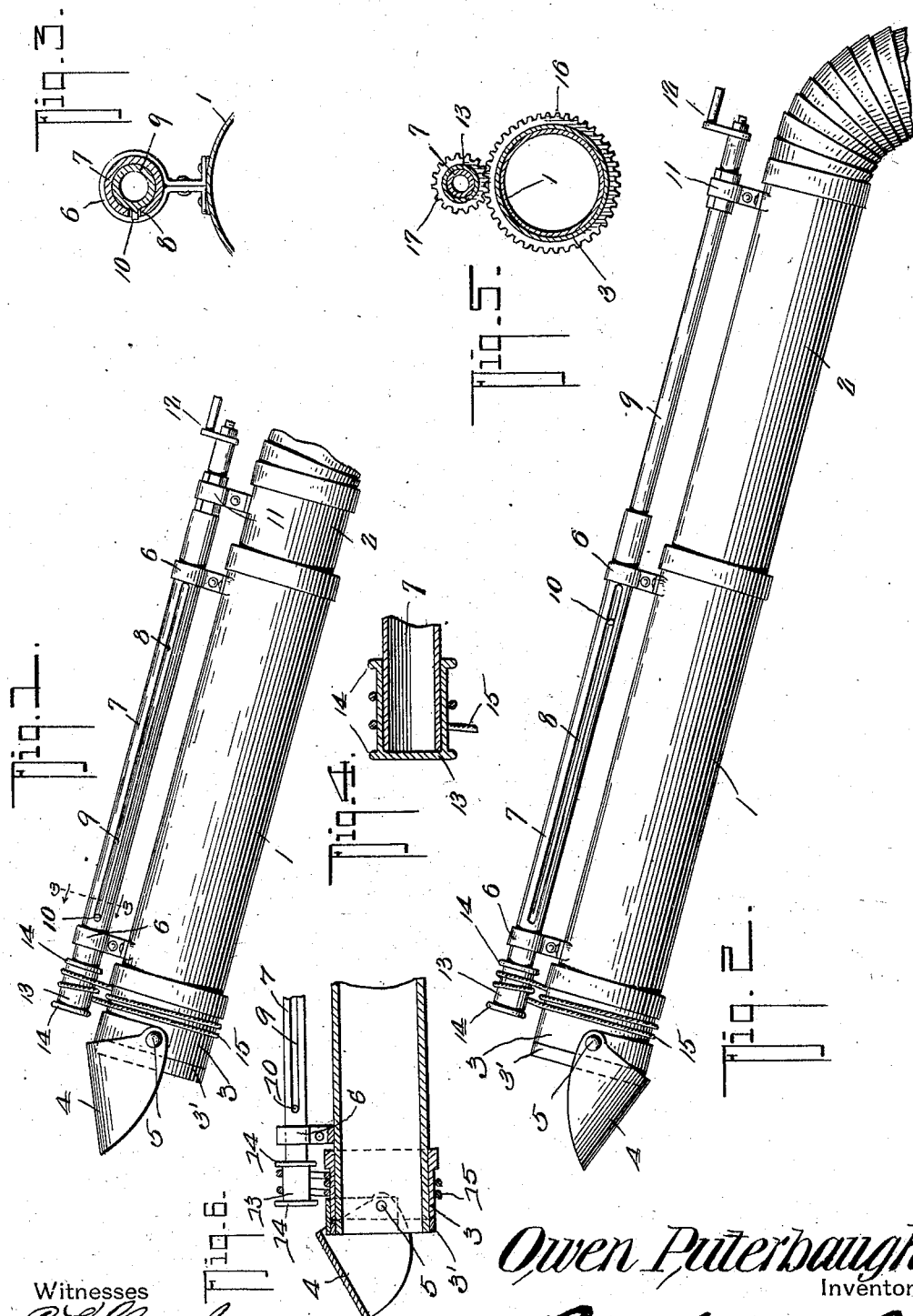

OWEN PUTERBAUGH, OF LAURA, OHIO.

PNEUMATIC STACKER.

No. 805,997.     Specification of Letters Patent.     Patented Nov. 28, 1905.

Application filed April 18, 1905. Serial No. 256,208.

*To all whom it may concern:*

Be it known that I, OWEN PUTERBAUGH, a citizen of the United States, residing at Laura, in the county of Miami and State of Ohio, have invented a new and useful Pneumatic Stacker, of which the following is a specification.

This invention relates to pneumatic stacking apparatus for threshing-machines, and it has particular reference to the means employed for effecting desired adjustment of the hood, whereby the straw passing through the stacker-tube may be guided in the desired direction.

The invention has for its object to simplify and improve the construction and operation of this class of devices; and with these and other ends in view, which will readily appear as the nature of the invention is better understood, the same consists in the improved construction and novel arrangement and combination of parts, which will be hereinafter fully described, and particularly pointed out in the claim.

In the accompanying drawings has been illustrated a simple and preferred form of embodiment of the invention, it being, however, understood that no limitation is necessarily made to the precise structural details therein exhibited, but that the right is reserved to any changes, alterations, and modifications to which recourse may be had within the scope of the invention and without departing from the spirit or sacrificing the efficiency of the same.

In said drawings, Figure 1 is a side elevation of a pneumatic stacker-tube having the invention applied thereto, the tube being shown collapsed. Fig. 2 is a similar view showing the stacker-tube extended. Fig. 3 is a sectional detail view taken on the line 3 3 in Fig. 1. Fig. 4 is a vertical sectional detail view taken through the upper end of the hood-adjusting device. Fig. 5 is a transverse sectional view illustrating a modification. Fig. 6 is a longitudinal sectional detail view of the device as shown in Fig. 2.

Corresponding parts in the several figures are indicated throughout by similar characters of reference.

The pneumatic stacker-tube of this invention is composed in the usual manner of collapsible members 1 and 2, the latter telescoping in the former. Upon the outer end of the upper member 1 is a hood-carrying sleeve 3, mounted for rotation, said sleeve being retained against outward displacement by means such as an annular band or flange 3'. The hood 4 may be hingedly connected with the sleeve, as indicated at 5, and suitable means may be provided for manipulating said hood independent of the adjustment of the sleeve.

The upper or outer tube member 1 is provided with bearings 6, in which a tubular member, such as an iron pipe 7 of suitable dimensions, is supported for rotation, the outer bearing member 6 serving to prevent inward or downward displacement of the sleeve 3, as will be readily understood. The pipe or tube 7 is provided with a longitudinal slot 8, and in said pipe telescopes a rod, or, if preferred, a pipe 9, having a laterally-extending stud 10 operating in the slot 8. A bearing 11 for the lower end of the member 9 is supported upon the lower or inner section 2 of the stacker-tube, and said member 9 is provided with a crank 12 whereby it may be rotated in its bearings, together with the tubular member 7. It is obvious that when the member 9 is rotated it will rotate the tube 7 by the stud 10 engaging the slot 8. It will be further evident that when the members 1 and 2 of the stacker-tube are extended or collapsed the members 7 and 9 will be extended or collapsed simultaneously therewith.

Upon the upper end of the tubular member 7 is mounted a cap 13, which is closed at its outer end, as clearly seen in Fig. 4, and which is provided with flanges 14 14 at the ends thereof. This cap is placed in approximate alinement with the hood-carrying sleeve and is connected with the latter by means of a cord or band 15, which may be wound one or more times upon the cap 13 and upon the sleeve, so that when the latter, which is firmly secured upon the tubular member 7, is rotated the hood-carrying sleeve will be likewise rotated, enabling it to be adjusted to various positions, as indicated in Figs. 1 and 2 of the drawings. The cap 13 being closed at its outer end will prevent particles of straw, chaff, and the like from working into the tubular member 7 and interfering with the operation of the device.

Under the modification illustrated in Fig. 5 of the drawings the hood-carrying sleeve 3 is provided with an external gear 16, meshing with a pinion 17 upon the cap 13, from which motion may thus be transmitted to the rotary hood-carrying sleeve, the gear being simply a substitute for the band means for transmitting motion.

From the foregoing description, taken in connection with the drawings hereto annexed, the operation and advantages of this invention will be readily understood by those skilled in the art to which it appertains. When the stacker-tube is extended or collapsed, the members for operating the hood-carrying sleeve are likewise extended or collapsed, as the case may be, so that in any position of the stacker-tube the said sleeve may be rotated for the purpose of changing the position of the hood carried thereby.

Having thus described the invention, what is claimed is—

A stacker-tube composed of telescoping tubular members, a hood-carrying sleeve supported for rotation upon the outer member, a longitudinally-slotted pipe supported for rotation in bearings upon said outer member, one of said bearings serving to support the hood-carrying sleeve against displacement, a member telescoping in said pipe and having an operating-crank and a stud engaging the slot in the pipe, a cap upon the outer end of the slotted pipe and constituting a closure for the latter, and means for transmitting motion from said cap to the rotary hood-supporting sleeve.

In testimony that I claim the foregoing as my own I have hereto affixed my signature in the presence of two witnesses.

OWEN PUTERBAUGH.

Witnesses:
L. D. EVANS,
CHAS. HENSON.